United States Patent
Bell et al.

[19]

[11] Patent Number: 5,937,057
[45] Date of Patent: Aug. 10, 1999

[54] VIDEO/AUDIO COMMUNICATIONS CALL CENTER AND METHOD OF OPERATION THEREOF

[75] Inventors: Robert T. Bell, Bountiful, Utah; Richard B. Platt, Allen, Tex.

[73] Assignee: Selsius Systems, Inc., Dallas, Tex.

[21] Appl. No.: 08/811,675

[22] Filed: Mar. 5, 1997

[51] Int. Cl.[6] .................................................. H04M 3/00
[52] U.S. Cl. ..................... 379/265; 379/266; 379/309; 379/93.25; 348/14
[58] Field of Search .............................. 348/14; 379/265, 379/266, 93.25, 93.17, 202, 309, 203

[56] References Cited

U.S. PATENT DOCUMENTS

| | | | |
|---|---|---|---|
| 4,672,662 | 6/1987 | Nishino et al. | 379/277 |
| 5,168,515 | 12/1992 | Gechter et al. | 379/265 |
| 5,495,284 | 2/1996 | Katz . | |
| 5,563,937 | 10/1996 | Bruno et al. | 379/93.12 X |
| 5,621,789 | 4/1997 | McCalmont et al. | 379/113 X |
| 5,661,283 | 8/1997 | Gallacher et al. . | |
| 5,760,823 | 6/1998 | Brunson et al. | 348/14 |
| 5,774,663 | 6/1998 | Randle et al. . | |

*Primary Examiner*—Creighton Smith
*Attorney, Agent, or Firm*—Baker & Botts, L.L.P.

[57] ABSTRACT

For use in a call center having a plurality of agent stations and an audio automatic call distribution system (ACD) for routing an incoming audio call received from a communications network to one of the plurality of agent stations, a system and method that allows the audio ACD to route an audio/video call received into the call center. The system includes: (1) an audio/video call control circuit for responding to a video portion of an incoming audio/video call from the communications network and routing an audio portion of the incoming audio/video call to the audio ACD, the audio ACD processing the audio portion as an incoming audio call and routing the audio portion to one of the plurality of agent stations and (2) a video routing circuit for determining an identity of the one of the plurality of agent stations and routing the video portion to the one of the plurality of agent stations in response thereto, both the audio portion and the video portion of the incoming audio/video call thereby routed to the one of the plurality of agent stations in response to routing control given by the audio ACD.

82 Claims, 7 Drawing Sheets

VIDEO/AUDIO COMMUNICATIONS CALL CENTER AND METHOD OF OPERATION THEREOF

CROSS-REFERENCE TO RELATED APPLICATIONS

This application is related to the following U.S. patents and U.S. patent applications:

| U.S. Pat. No. or Serial No. | Title | Inventor(s) | Filing Date |
|---|---|---|---|
| 5,594,732 | BRIDGING AND OUT-OF-BAND SIGNALING SUBSYSTEMS AND METHODS FOR A MULTIMEDIA SYSTEM | Robert T. Bell, et al. | March 3, 1995 |
| 08/397,945 | SYSTEM AND METHOD FOR SIGNALING AND CALL PROCESSING FOR PRIVATE AND HYBRID VIDEO/AUDIO COMMUNICATIONS SYSTEMS INCLUDING MULTIMEDIA SYSTEMS | Robert T. Bell, et al. | March 3, 1995 |
| 08/402,834 | DISTRIBUTED INTERACTIVE MULTIMEDIA SYSTEM ARCHITECTURE | Paul S. Hahn, et al. | March 13, 1995 |
| 08/404,191 | MULTIMEDIA CLIENT FOR MULTIMEDIA/HYBRID NETWORK | Ronald D. Higgins, et al. | March 13, 1995 |
| 08/379,365 | MULTIMEDIA SYSTEM HAVING CENTRAL POWER SOURCE AND DISTRIBUTION SUBSYSTEM | Richard K. Hunter, et al. | January 27, 1995 |

The above-listed patents and patent applications are commonly assigned with the present invention and are incorporated herein by reference as if reproduced herein in their entirety.

TECHNICAL FIELD OF THE INVENTION

The present invention is directed, in general, to a communications call center and, more specifically, to a system and method for managing the distribution of voice, video and data in a communications network.

BACKGROUND OF THE INVENTION

Currently, "information superhighway" and "multimedia" are probably the most often spoken and least often understood aspects of a coming revolution in data communication. Although issues specific to an information superhighway are beyond the scope of the present discussion, interactive multimedia systems are very much within the present scope.

An interactive multimedia system is broadly defined as a system capable of processing, storing, communicating and coordinating data pertaining to visual information, aural information and other information. Visual information is generally divided into still picture or graphics and full motion video or animation categories. In the vernacular of those involved in multimedia, such visual information is generically referred to as "video." Aural information is generally divided into speech and non-speech categories and is generically referred to as "voice." "Other information" is directed primarily to computer data, often organized in files and records, and perhaps constituting textual and graphical data. Such computer data are generally referred to as "data."

To date, multimedia has, for the most part, been limited to stand-alone computer systems or computer systems linked together in a local area network ("LAN"). While such isolated systems have proven popular and entertaining, the true value of multimedia will become apparent only when multimedia-capable wide area networks ("WANs") and protocol systems are developed, standardized and installed that permit truly interactive multimedia. Such multimedia systems will allow long distance communication of useful quantities of coordinated voice, video and data, providing, in effect, a multimedia extension to the voice-only services of the ubiquitous telephone network.

In many instances, call centers (employing audio automatic call distribution systems ("ACDs")) are employed throughout the telephone network (e.g., at a customer's premises) to facilitate the management of voice services therein and the associated customer information database. The call centers have progressed from a group of people at a centralized facility assigned manually to handle all incoming or outgoing calls on a dedicated set of trunks to intelligent call reception, network routing and automatic call processing functionality. Computer automation of the basic call center functions is becoming the standard thereby adding flexibility and intelligence to the telephone operations properly to direct and process the call flow for maximized service response and resource efficiency. Access to host computer databases, coupled with more caller information from the network, are providing new intelligence for dynamic and selective call direction. In addition, there is a trend toward automating modern call centers thereby minimizing human decision-making responsibilities and mechanical functions that slow down or cause errors in the call handling process.

The initial call center technology for handling greater call traffic volumes was focused upon queuing strategies for keeping callers waiting until an available telephone representative was available. The present automated systems, employed in equipment such as ACDs, manage several functions, including: accepting incoming calls, placing calls in a priority order, routing calls to the least busy agent, queuing calls if no agents are available, providing music and announcements while the calls are in the queue, transitioning overflow queued calls to an alternative queue or to voice mail after a prescribed interval and collecting and processing call statistics.

A conventional ACD is commonly equipped with an automated attendant on the front end to assist the call routing and voice mail on the back end to handle overflows and give callers the option of leaving a message instead of waiting. The ACD may also provide distinctive treatment to certain class of callers, for instance, a special group of customers can be routed to a group of agents that have special training. Again, call centers employing ACDs are presently directed at managing the communication of voiceonly, not multimedia, services.

Introducing interactive multimedia into a traditionally voiceonly system presents several unique challenges. Interactive multimedia system must be able to exchange voice, video and data between two or more people interactively through an electronic medium in real time. Because of its interactive and real-time nature, stringent requirements and required services exist that are not normally associated with noninteractive multimedia retrieval systems. Some of the more obvious examples of those requirements and services include latency (transmission delay), conferencing, availability ("up-time") and interoperability. The general compatibility issues related to interactive multimedia systems are disclosed in the above-identified U.S. Patent Applications commonly assigned with the present invention and previously incorporated by reference.

Thus, while ACDs are known in the prior art, prior art ACDs are strictly limited to handling audio information and are, therefore, incapable of handling interactive multimedia services. Accordingly, what is needed in the art is a recognition that prior art ACDs can be made to cooperate with multimedia networks to result in a multimedia extension to the ACD. Further, what is needed in the art is a call center for a communications network that can manage fully-interactive multimedia information in an integrated system.

SUMMARY OF THE INVENTION

To address the above-discussed deficiencies of the prior art, the present invention to provides for use in a call center having a plurality of agent stations and an audio automatic call s distribution system ("ACD") for routing an incoming audio call received from a communications network to one of the plurality of agent stations, a system and method that allows the audio ACD to route an audio/video call received into the call center.

The system includes (1) an audio/video call control circuit for responding to a video portion of an incoming audio/video call from the communications network and routing an audio portion of the incoming audio/video call to the audio ACD, the audio ACD processing the audio portion as an incoming audio call and routing the audio portion to one of the plurality of agent stations and (2) a video routing circuit for determining an identity of the one of the plurality of agent stations and routing the video portion to the one of the plurality of agent stations in response thereto, both the audio portion and the video portion of the incoming audio/video call thereby routed to the one of the plurality of agent stations in response to routing control given by the audio ACD.

The system of the present invention integrates a video and audio call center into a single functional unit. In the present embodiment, the system expands the capability of the audio ACD by adding video functionality thereto. The video routing circuit determines the identity and monitors a status of the one of the plurality of agent stations and transmits the video portion of the incoming audio/video call in response to a change in status thereof. The audio portion and the video portion are routed to the one of the plurality of agent stations providing a dynamic audio/video call. The video routing circuit may also monitor characteristics or operating conditions, indicative of a transfer of the audio information to the one of the plurality of agent stations, of other equipment or nodes associated with the system to execute the dynamic audio/video call.

The system therefore provides multimedia capability in a single functional unit without substantially modifying the audio ACD. The integration is completed through the audio/video call control circuit and the video routing circuit, in the present embodiment, and the application thereof. In addition, the reporting (e.g., statistical information) for the call center may be preserved due to the one-to-one relationship between the audio and video portion of the incoming audio/video call.

In an alternative embodiment of the present invention, the communications network includes a public switched network. A public network generally encompasses a network operated by common carriers or telecommunication administrations for the provision of circuit switched, packet switched or leased-lined circuits to the public. Those skilled in the art should understand that other communications networks, such as a private switched network, are well within the broad scope of the present invention. For the purposes of the present invention, a private switched network includes, without limitation, a communications network that is completely within a private communications environment and also a hybrid network that includes both a public switched network and private switched network component cooperating to present a user with a unified system. For instance, a hybrid network may include a series of private private branch exchange ("PBX") supplied sites that are linked together via an inter-exchange carrier implementation of a virtual private network.

In an alternative embodiment of the present invention, the incoming audio/video call is received from a video kiosk. As is well known in the art, a video kiosk generally includes a plurality of audio/video instruments capable of generating an audio/video communication. Of course, other sources capable of providing an audio/video call are well within the broad scope of the present invention.

In an alternative embodiment of the present invention, the one of the plurality of agent stations includes a multimedia personal computer ("PC"). A multimedia PC integrates voice, video and data at a single workstation. Generally, the communication capabilities of agent stations, such as the multimedia PC, include in the simplest form, a file transfer with an accompanying message to a remote locale; a more sophisticated example includes a video conferencing session between a plurality of agent stations. Those skilled in the art should be familiar with the capabilities of multimedia PCS and, additionally, should recognize that other multimedia communication devices acting as agent stations are well within the broad scope of the present invention.

In an alternative embodiment of the present invention, the audio ACD is integrated into a private branch exchange ("PBX"). A PBX is generally a private telephone switching system, usually located at a customer's premises. Integrating the audio ACD into the PBX provides additional functionality therein. Thus, the audio ACD provides an automated call processing engine integral to the PBX. Those skilled in the art should be familiar with audio ACDs and should further recognize that other call distribution systems may be employed as ACDs in the system of the present invention.

In an alternative embodiment of the present invention, the audio ACD transmits a signal representing the routing control to the video routing circuit via a signalling path or channel. Thus, the video routing circuit not only monitors a status of the one of the plurality of agent stations, but it provides the routing control of the video portion of the incoming audio/video call via a signal from the audio ACD. Of course, the system of the present invention is compatible with any type of signaling protocol employable over different interfaces and supported by various specifications.

In an alternative embodiment of the present invention, the incoming audio/video call includes computer data, the computer data routed to the one of the plurality of agent stations through the video routing circuit. The computer data is essentially treated as an additional component of the incoming audio/video call. The audio/video call control circuit responds to the computer data and the video routing circuit determines an identity of the one of the plurality of agent stations and routes the computer data to the one of the plurality of agent stations in response thereto. In short, the system of the present invention is compatible with all forms of communication related media.

In an alternative embodiment of the present invention, the audio/video call control circuit processes an initial set of video messages and the video routing circuit routes the messages to a calling party through the communications network. The calling party may be presented with a video message sequence and an accompanying voice message, if desired, prior to routing the voice/video call to the one of the plurality of agent stations. For instance, the calling party may be prompted through a series of questions to assist in the ultimate routing of the incoming audio/video call.

In an alternative embodiment of the present invention, the audio/video call control circuit terminates the incoming audio/video call when the one of the plurality of agent stations releases the video portion of the call. Alternatively, the call may be terminated by the audio ACD when the one of the plurality of agent stations releases the audio portion of the call. In either case, the release of one portion of the incoming audio/video call triggers the one of the plurality of agent stations to release the other portion of the call. The one of the plurality of agent stations then proceeds through a wrap-up procedure and the station returns to a ready state for another incoming audio/video call.

In another aspect of the present invention, the system includes: (1) an audio/video call control circuit, having an associated call queue, for storing a video portion of an incoming audio/video call from the communications network and routing an audio portion of the incoming audio/video call to the audio ACD, the audio ACD processing the audio portion as an incoming audio call and generating a control signal to route the audio portion to one of the plurality of agent stations and (2) an audio/video routing circuit for determining an identity of the one of the plurality of agent stations and routing both the audio portion and the video portion to the one of the plurality of agent stations in response thereto, both the audio portion and the video portion of the incoming audio/video call thereby routed to the one of the plurality of agent stations in response to the control signal generated by the audio ACD. The system, in the present embodiment, routes the audio and video portion of the incoming audio/video call through the audio/video routing circuit. For the purposes of the present invention, the term "storing" (as applied to the video portion of an audio/video call) includes, without limitation, temporarily queuing the video portion together with any associated computer data originating from a remote user for subsequent redirection to one of a plurality of agent stations.

Another aspect of the present invention is a call center, including: (1) a plurality of agent stations, (2) an audio ACD for routing an incoming audio call received from a communications network to one of the plurality of agent stations and (3) a system for allowing the audio ACD to route an audio/video call received into the call center constructed according to the principles of the present invention.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

While the system of the present invention will hereinafter be described in a specific environment (e.g., IEEE 802.9a and ISDN employing a specific interactive multimedia system and components, such as the WAN hub), the foregoing embodiment is set forth for illustrative purposes only. Of course, other embodiments of the present invention employable in other network infrastructures are well within the broad scope of the present invention.

Figure 1:
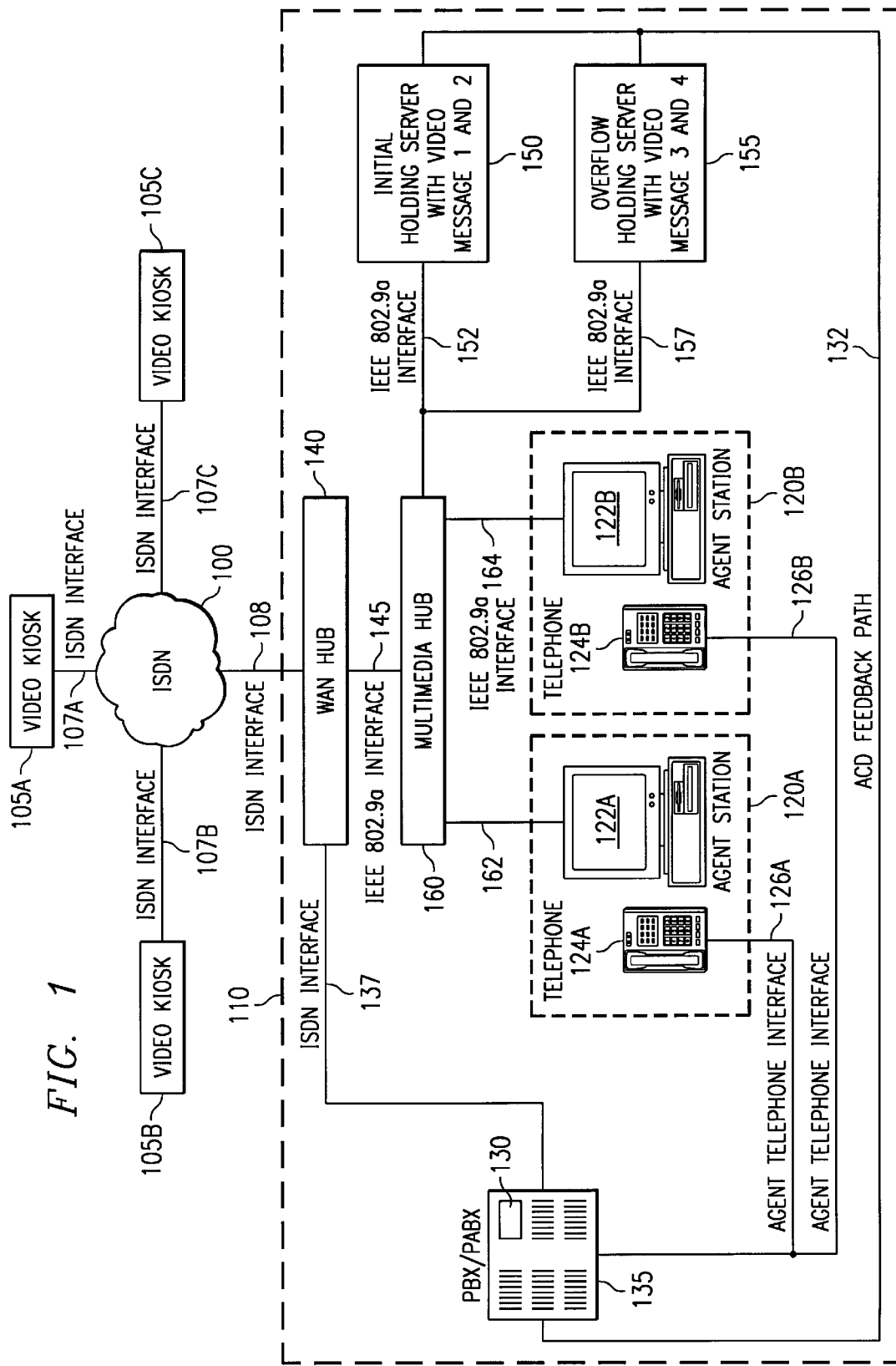
FIG. 1 illustrates an embodiment of a call center within a communications network employing an embodiment of a system constructed according to the principles of the present invention.

Referring initially to FIG. 1, illustrated is an embodiment of a call center 110 within a communications network 100 employing an embodiment of a system constructed according to the principles of the present invention. The communications network 100 [e.g., an Integrated Services Digital Network ("ISDN")] and is coupled to a plurality video kiosks 105A, 105B, 105C through an ISDN link 107A, 107B, 107C, respectively. The video kiosks 105A, 105B, 105C include, without limitation, an H.320 video codec, a network interface card [e.g., an IsoEthernet Network Interface Card ("NIC")], a network gateway and the associated software. While the communications network 100 is an Integrated Services Digital Network, other communications networks are well within the broad scope of the present invention. The communications network 100 is further coupled to the call center 110 through an ISDN link 108.

The call center 110 includes a plurality of agent stations 120A, 120B, an audio automatic call distribution system ("ACD") 130 for routing an incoming audio call received from communications network 100 to one of the plurality of agent stations 120A, 120B and the system for allowing the audio ACD 130 to route an audio/video call received into the call center 110. The audio ACD 130 includes, without limitation, a network gateway (e.g., a primary rate ISDN trunk interface), a central ACD controller function and a notification function to transmit changes of station status to the system of the present invention. The plurality of agent stations 120A, 120B each include, without limitation, a personal computer ("PC") 122A, 122B and a telephone instrument 124A, 124B, respectively. The audio ACD 130 is enclosed within a PBX 135 to provide an automated call processing engine integral to the PBX 135. The plurality of agent stations 120A, 120B and the PBX 135 are coupled together via an agent telephone link 126A, 126B, respectively.

The system of the present invention is embodied within a plurality of modules as hereinafter described. The system includes a WAN hub 140 for receiving an incoming audio/video call from the communications network 100. The system also includes an initial holding server 150, having a call queue associated therewith, for queuing a video portion of the incoming audio/video call and routing an audio portion of the incoming audio/video call to the audio ACD 130. The audio ACD 130 processes the audio portion as an incoming audio call and routes the audio portion to one of the plurality of agent stations 120A, 120B. The system further includes an overflow holding server 155. The overflow holding server 155 is functionally similar to the initial holding server 150 but is employed to receive and hold calls when either the initial holding server 150 has no more available queue positions or if the call reaches a certain state. The system still further includes a multimedia hub 160 for determining an identity of the one of the plurality of agent stations 120A, 120B and routing the video portion to the one of the plurality of agent stations 120A, 120B in response thereto. Both the audio portion and the video portion of the incoming audio/video call are thereby routed to the one of the plurality of agent stations 120A, 120B in response to routing control given by the audio ACD 130. The system of the present invention is also compatible with other types of information including, without limitation, computer data. Such data is typically treated as an additional component of the audio/video call and routed through the multimedia hub 160.

The communication between the audio ACD 130 and the WAN hub 140 is through an ISDN link 137. The WAN hub 140, multimedia hub 160, initial holding server 150, overflow holding server 155 and plurality of work stations 120A, 120B are coupled through an IEEE 802.9 link 145, 152, 157, 162, 164. Additionally, the audio ACD 130 and the initial and overflow holding servers 150, 155 are coupled together via an ACD feedback path (or signaling path) 132.

The system of the present invention integrates a video and audio call center into a single functional unit. In the present embodiment, the system expands the capability of the audio ACD 130 by adding video functionality thereto. The initial holding server 150 (embodying an audio/video call control circuit) responds to a video portion of an incoming audio/video call from the communications network 100 and routes an audio portion of the incoming audio/video call to the audio ACD 130. The multimedia hub 160 (embodying a video routing circuit) determines the identity and monitors a status of the one of the plurality of agent stations 120A, 120B and transmits the video portion of the incoming audio/video call in response to a change in status thereof. The audio portion and the video portion are routed to the one of the plurality of agent stations 120A, 120B providing a dynamic audio/video call. The multimedia hub 160 may also monitor characteristics or operating conditions, indicative of a transfer of the audio information to the one of the plurality of agent stations 120A, 120B, of other equipment or nodes associated with the system to execute the dynamic audio/video call.

There is some interesting problems associated with the video portion of the video call. For instance, if the video call includes a multiple call video session, it may take two or more connections to create the video channel. The system of the present invention aggregates the video channels and synchronizes the information to provide a real-time video call. For a better understanding of channel aggregation, see ITU-T Recommendation H.244-1995, "Synchronized Aggregation of Multiple 64 or 56 kbit/s Channels." The aforementioned reference is incorporated herein by reference.

Figure 2:
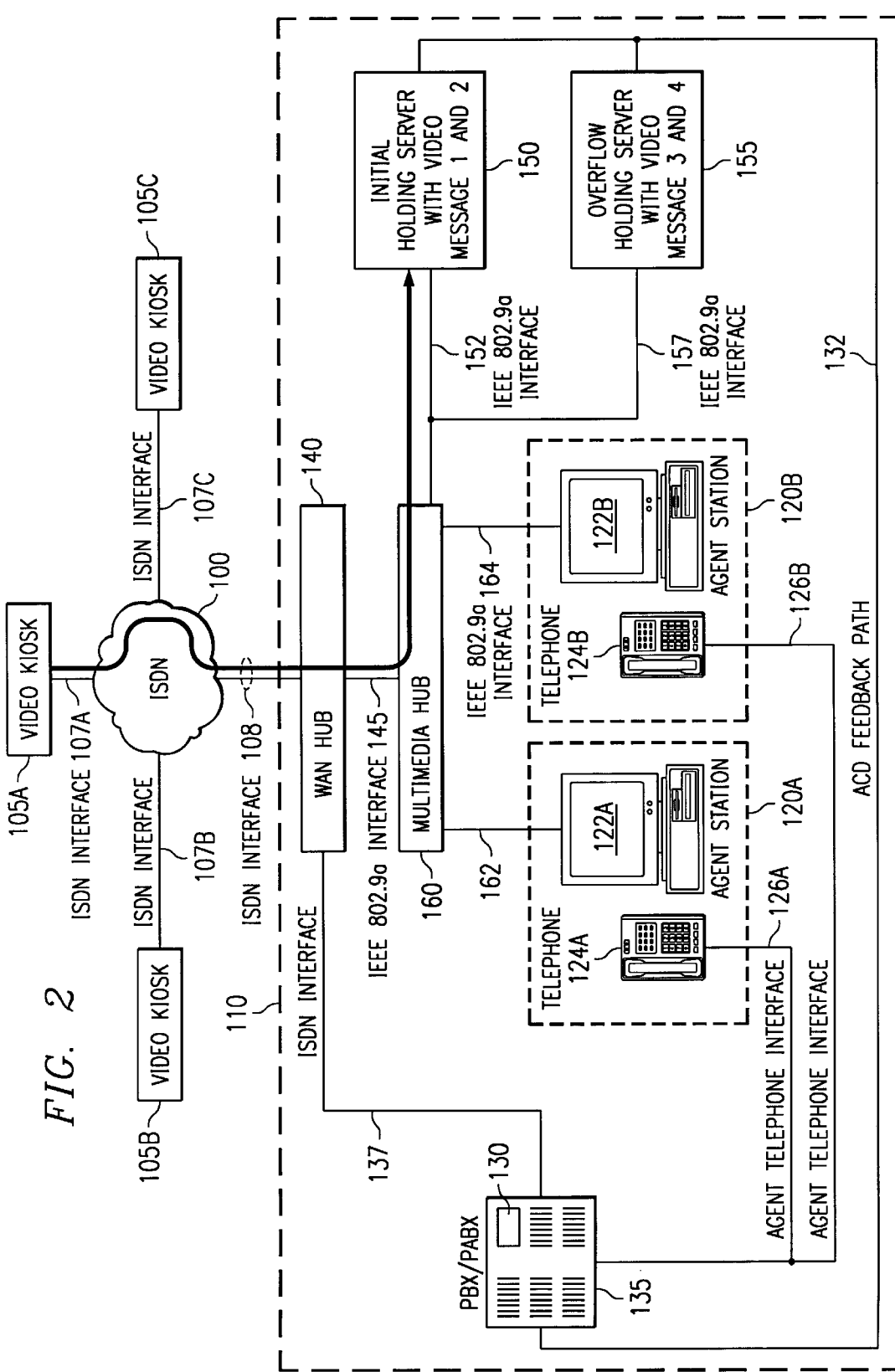
FIG. 2 illustrates an embodiment of an initial call presentation into the call center of FIG. 1.

Turning now to FIG. 2, illustrated is an embodiment of an initial call presentation into the call center 110 of FIG. 1. A video call originates from the video kiosk 105A through the ISDN link 107A, communications network 100 and ISDN link 108 and is presented to the system of the present invention at the WAN hub 140. The video call is then routed from the WAN hub 140 through the multimedia hub 160 (via the IEEE 802.9 link 145) to the initial holding server 150 (via the IEEE 802.9 link 152). At the initial holding server 150, the video call is answered and any initial messaging to the caller is presented.

Figure 3:
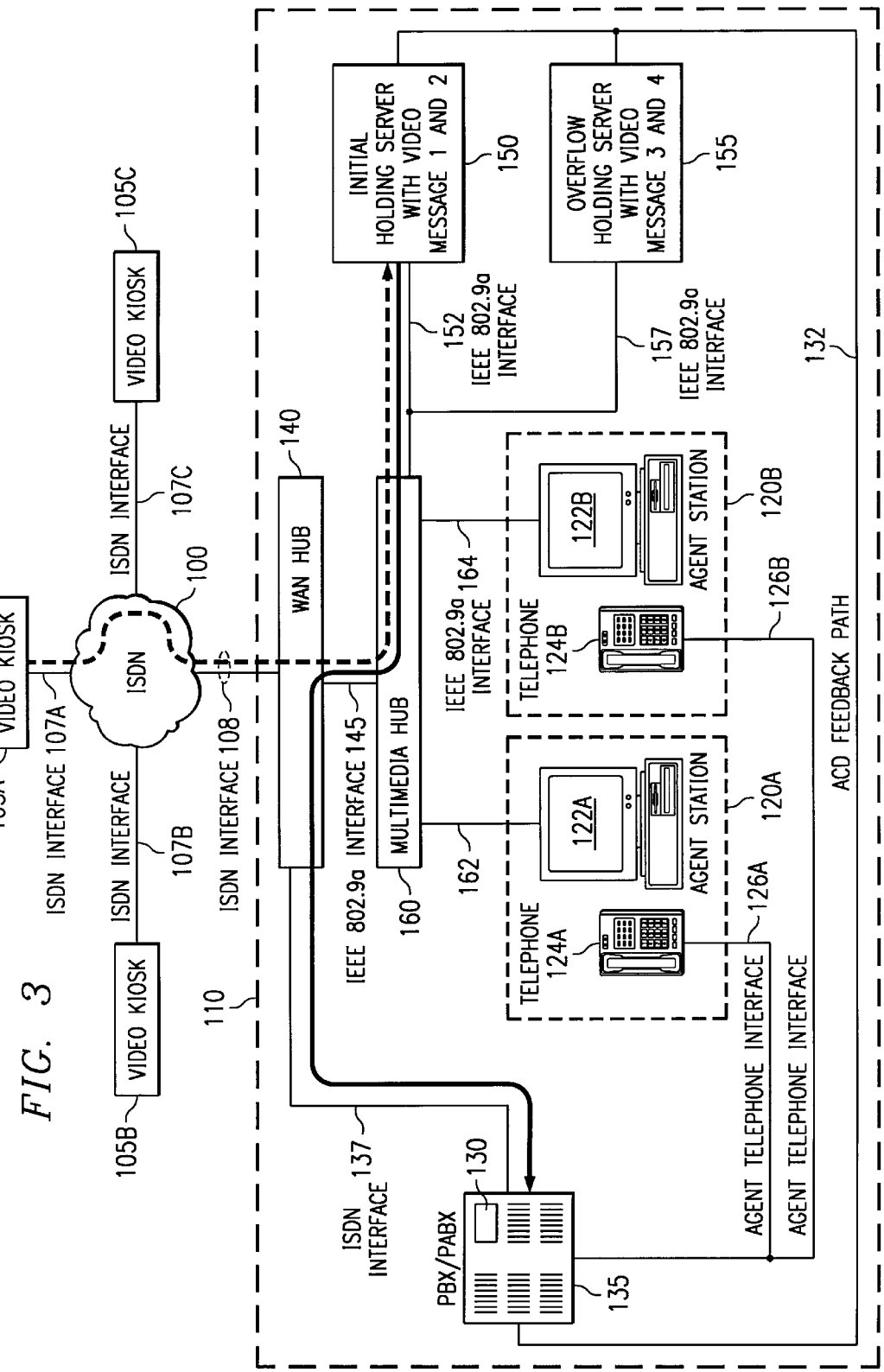
FIG. 3 illustrates an embodiment of an initiation of an audio portion of the call of FIG. 2.

Turning now to FIG. 3, illustrated is an embodiment of an initiation of an audio portion of the call of FIG. 2. At the same time that the caller is presented with the initial messaging, the initial holding server 150 initiates an audio only call to the pilot number of the ACD group associated with the audio ACD 130. The audio portion of the call traverses the multimedia hub 160 (via the IEEE 802.9 link 152) and the WAN hub 140 (via the IEEE 802.9 link 145) to the audio ACD 130 (via the ISDN link 137). As the call is presented to the audio ACD function, it enters an ACD queuing sequence and the caller is presented with various information. The initial holding server 150 presents one or more video messages to the caller and the audio from the audio ACD 130 is preferably mixed with the video to provide a series of audio/video messages to the caller waiting in the event of a backlog of calls.

Figure 4:
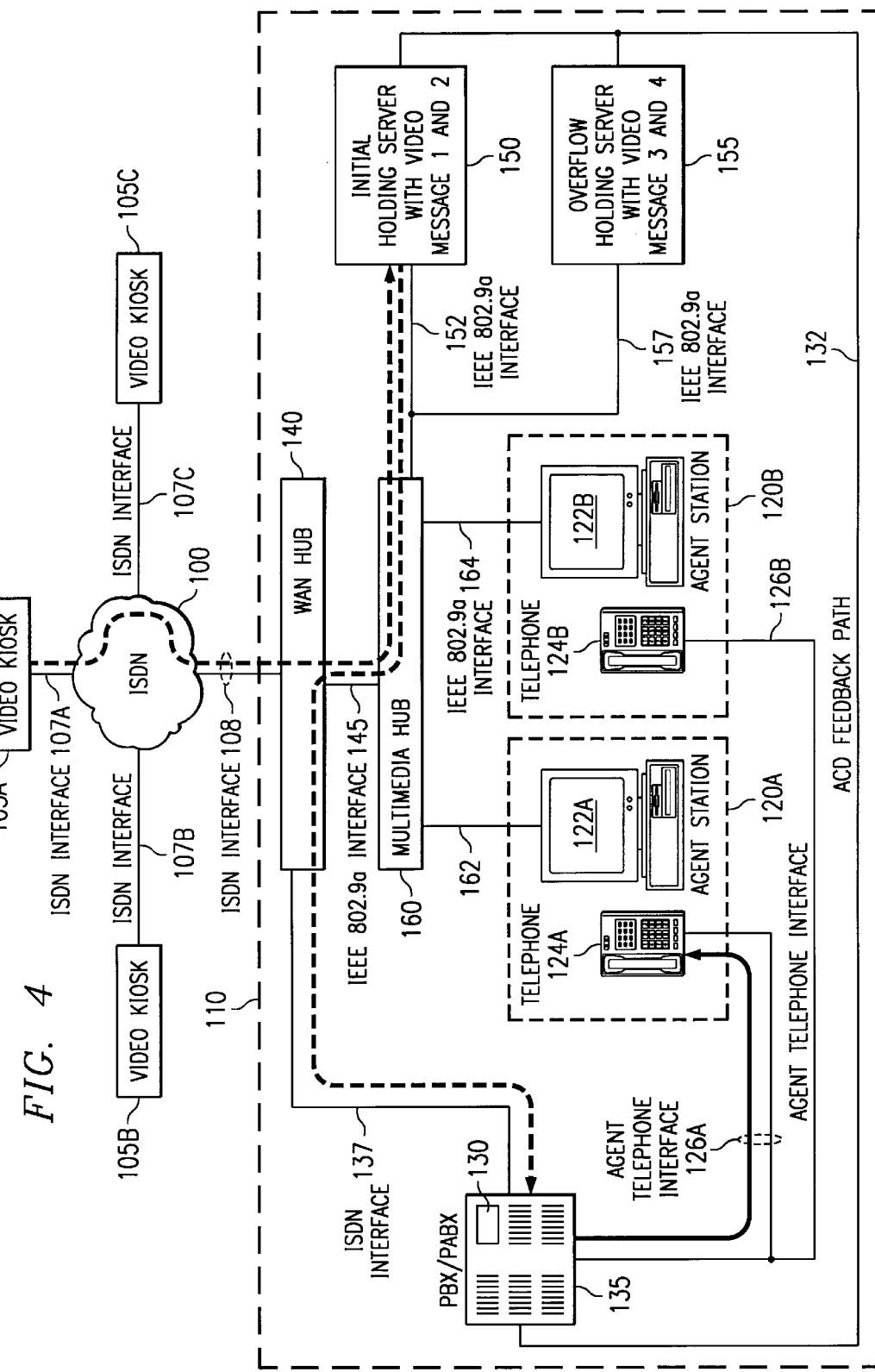
FIG. 4 illustrates an embodiment of a selection of an agent station within the call center of FIG. 1.

Turning now to FIG. 4, illustrated is an embodiment of a selection of an agent station 120A within the call center 110 of FIG. 2. The ACD function eventually assigns the call to the agent station 120A for processing. Once the agent station 120A is selected and the telephone instrument 124A is alerted (via the agent telephone link 126A), the agent answers the audio portion of the call.

Figure 5:
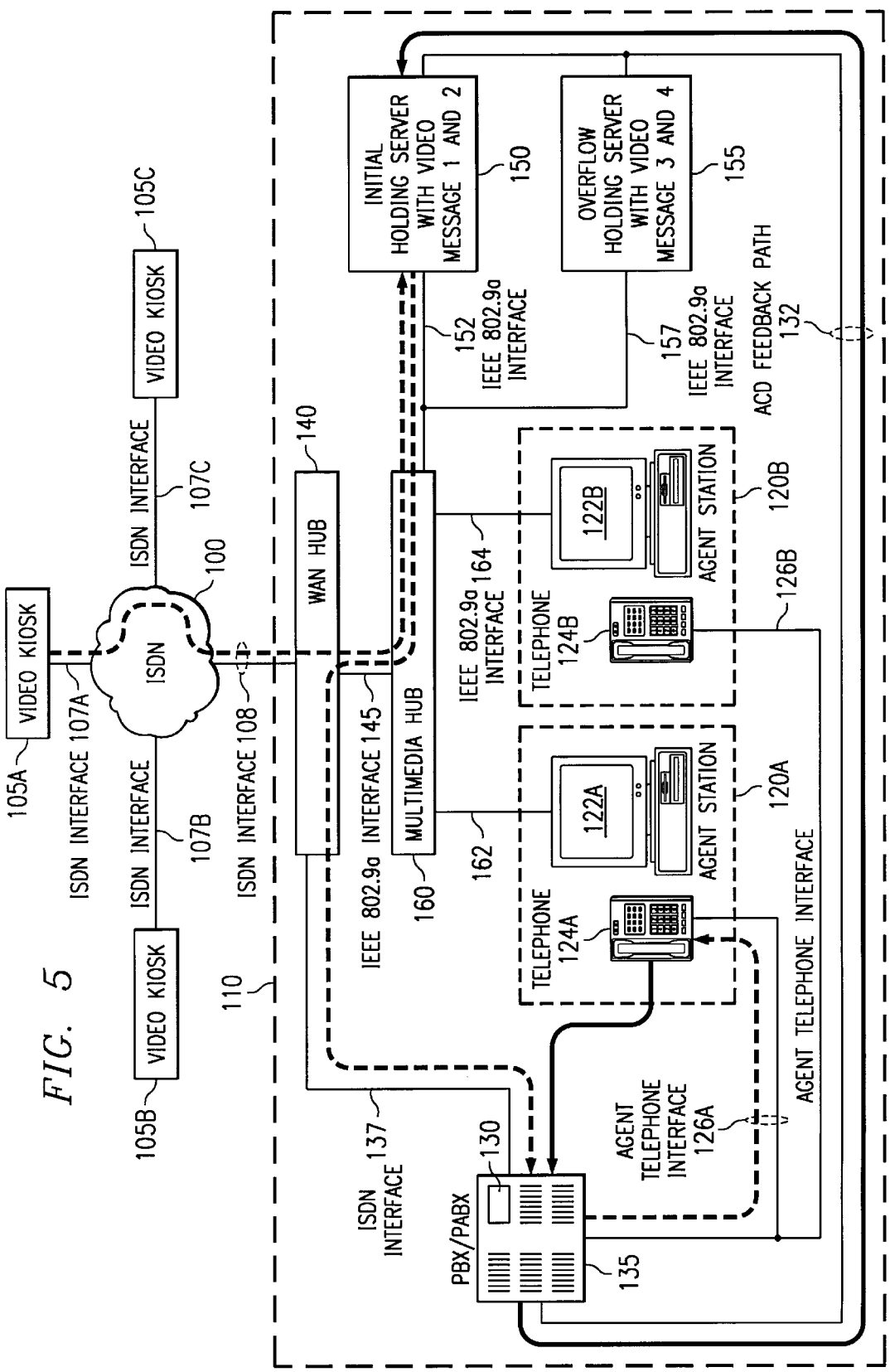
FIG. 5 illustrates an embodiment of a response by the agent station selected in FIG. 4.

Turning now to FIG. 5, illustrated is an embodiment of a response by the agent station 120A selected in FIG. 4. Once the agent answers the audio portion of the call, the initial holding server 150 is notified of a status change indicating that the agent station 120A is ready to proceed. The notification occurs by the agent station 120A transmitting a message through the audio ACD 130 (via the agent telephone link 126A) to the initial holding server 150 (via the ACD feedback path 132).

Figure 6A:
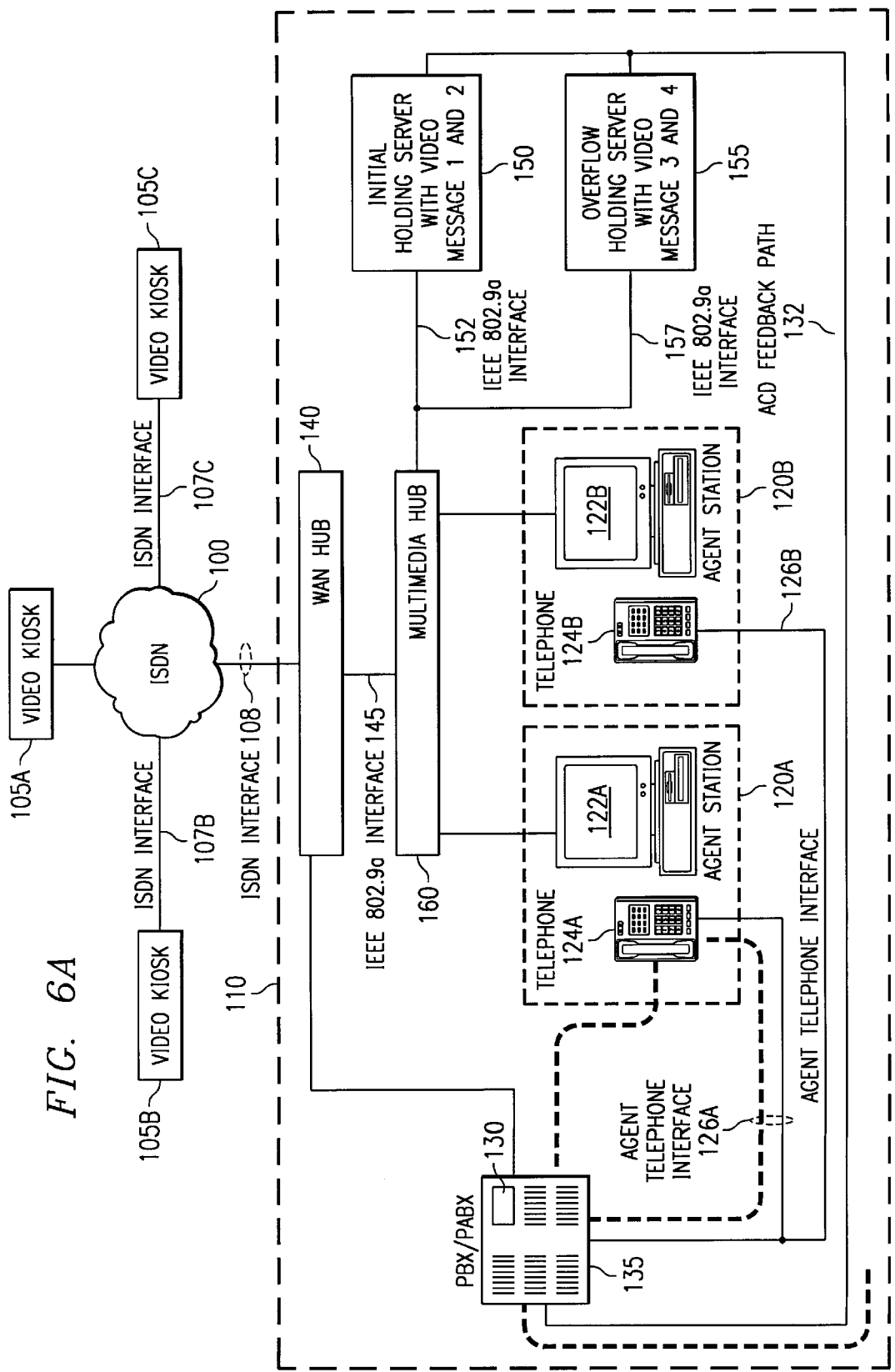
FIG. 6A illustrates an embodiment of a transfer of a video portion of the call of FIG. 2.

Turning now to FIG. 6A, illustrated is an embodiment of a transfer of a video portion of the call of FIG. 2. As a result of the notification by the audio ACD 130 to the initial holding server 150, the audio call (which is connected to the telephone instrument 124A) and the video call are both transferred to the agent station 120A associated with the selected telephone instrument 124A. Within the system of the present invention, the audio portion of the call traverses the WAN hub 140 through the multimedia hub 160 (via the IEEE 802.9 links 145, 162) to the agent station 120A; the video portion of the call traverses the WAN hub 140 and the multimedia hub 160 (via the IEEE 802.9 links 145, 162) to the agent station 120A. In the illustrated embodiment, the telephone instrument 124A acts as the audio input to the video call now terminating at the agent station 120A. In this state, the agent and the caller transact the purpose of the call.

If either the caller or the agent terminates the call, the audio portion of the conversation will terminate enabling the audio ACD function to maintain the required call status information for reporting purposes. In addition, the termination of the audio portion of the call will also invoke the termination of the video portion of the call. The agent then proceeds through the normal wrap-up procedure and is eventually placed in a ready state. The system is then ready for the next call.

Figure 6B:
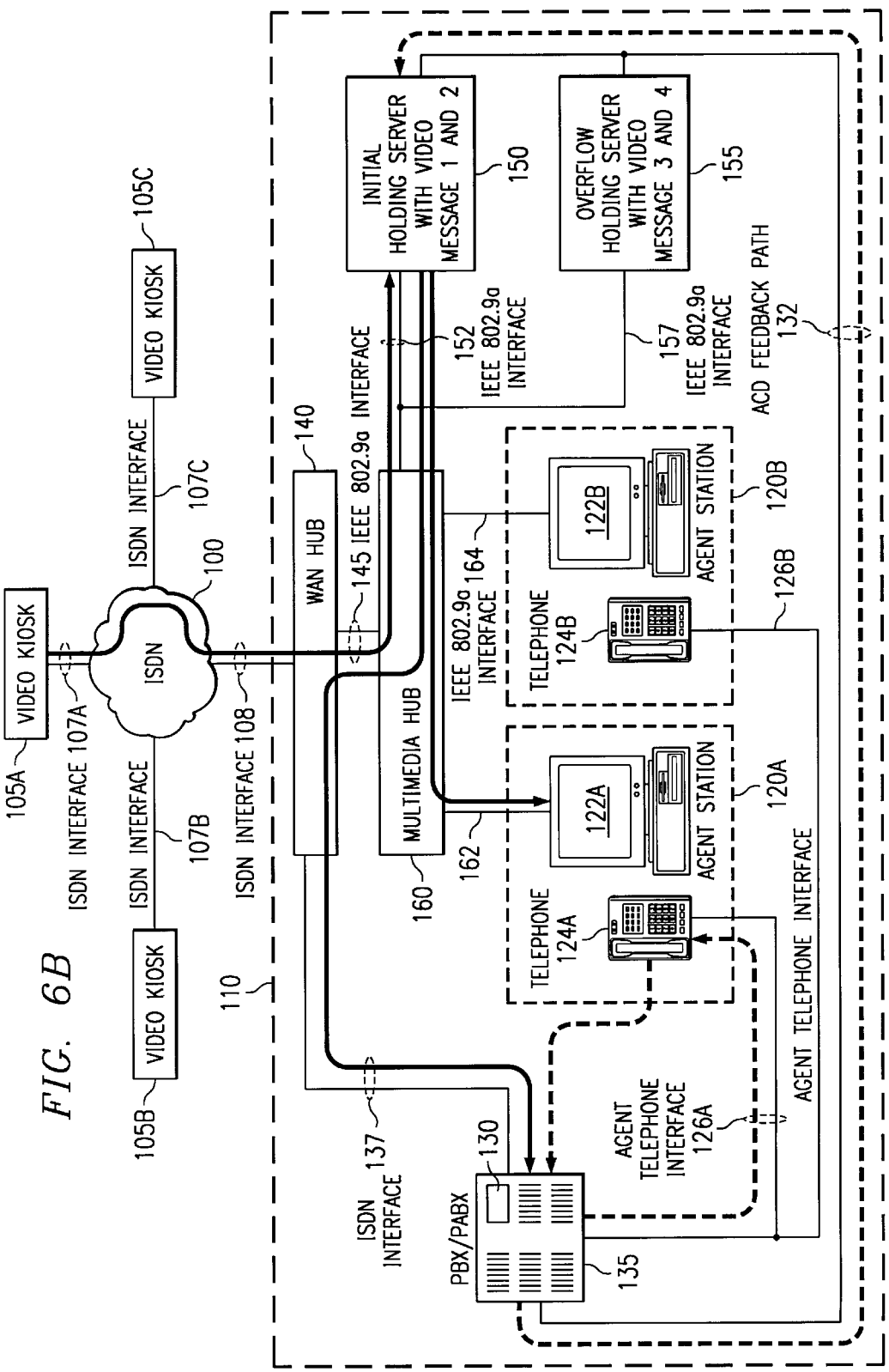
FIG. 6B illustrates another embodiment of a handling of a video portion of the call of FIG. 2.

Turning now to FIG. 6B, illustrated is another embodiment of a handling of a video portion of the call of FIG. 2. As a result of the notification by the audio ACD 130 to the initial holding server 150, the audio call (which is connected to the telephone instrument 124A) and the video call (which is connected to agent station 120A) are associated together within the initial holding server 150. The associated call is then interconnected with the incoming video call that originated from the video kiosk 105A. Within the system of the present invention, the video portion of the call traverses the WAN hub 140 and the multimedia hub 160 (via the IEEE 802.9 links 145, 162) to the initial holding server 150. The video portion of the call is then connected from the initial holding server 150 through the multimedia hub 160 to the agent station 120A; the audio portion of the call is connected from the initial holding server 150 through the multimedia hub 160 and WAN hub 140 to the audio ACD 130. In the illustrated embodiment, the telephone instrument 124A acts as the audio input to the video call. In this state, the agent and the caller transact the purpose of the call.

Again, if either the caller or the agent terminates the call, the audio portion of the conversation will terminate enabling the audio ACD function to maintain the required call status information for reporting purposes. In addition, the termination of the audio portion of the call will also invoke the termination of the video portion of the call. The agent then proceeds through the normal wrap-up procedure and is eventually placed in a ready state. The system is then ready for the next call.

It is important to note that the audio ACD 130 is not modified in any manner. All of the integration is completed within the video call center application. In addition, all of the reporting for the call center 110 is preserved because of the one-to-one relationship between the video and audio calls.

As previously mentioned, the audio portion of the video call and the video portion of the video call are ultimately routed to one of the plurality of agent stations 120A, 120B through the audio ACD 130 and video routing circuit, associated with the multimedia hub 160, respectively. Those skilled in the art should understand that both the audio and video portion of the video call may also be routed to one of the plurality of agent stations 120A, 120B through a audio/video routing circuit associated with the multimedia hub 160.

Those skilled in the art should further understand that, while the present invention is illustrated as embodied in hardware, alternative embodiments include those based in software, firmware or combinations thereof. Such embodiments may include implementations using conventional processing circuitry such as, without limitation, programmable logic arrays ("PLAs"), digital signal processors ("DSPs"), field programmable gate arrays ("FPGAs"), and application specific integrated circuits ("ASICs").

Conventional computer and processing system architecture is more fully discussed in *Computer Organization and Architecture*, by William Stallings, MacMillan Publishing Co., 3rd Ed. (1993). Conventional processing system network design is more fully discussed in *Data Network Design*, by Darren L. Spohn, McGraw-Hill, Inc. (1993). Conventional voice and data communications are more fully discussed in *Data Communications Principles*, by R. D. Gitlin, J. F. Hayes and S. B. Weinstein, Plenum Press (1992), *The Irwin Handbook of Telecommunications*, by James Harry Green, Irwin Professional Publishing, 2nd Ed. (1992) and *Voice & Data Communications Handbook*, by Regis J. Bates, Jr. and Donald Gregory, McGraw-Hill (1996). Conventional electronic circuit design is more fully discussed in *The Art of Electronics*, by Paul Horowitz and Winfield Hill, Cambridge University Press, 2nd Ed. (1989). Conventional control systems and architectures are discussed in *Modern Control Engineering* by Katsuhiko ogata, Prentice Hall (1990). Each of the foregoing publications is incorporated herein by reference.

Although the present invention and its advantages have been described in detail, those skilled in the art should understand that they can make various changes, substitutions and alterations herein without departing from the spirit and scope of the invention in its broadest form.

What is claimed is:

1. For use in a call center having a plurality of agent stations and an audio automatic call distribution system (ACD) for routing an incoming audio call received from a communications network to one of said plurality of agent stations, a system that allows said audio ACD to route an audio/video call received into said call center, comprising:

an audio/video call control circuit for responding to a video portion of an incoming audio/video call from said communications network and routing an audio portion of said incoming audio/video call to said audio ACD, said audio ACD processing said audio portion as an incoming audio call and routing said audio portion to one of said plurality of agent stations; and a video routing circuit for determining an identity of said one of said plurality of agent stations and routing said video portion to said one of said plurality of agent stations in response thereto, both said audio portion and said video portion of said incoming audio/video call thereby routed to said one of said plurality of agent stations in response to routing control given by said audio ACD.

2. The system as recited in claim 1 wherein said communications network comprises a public switched network.

3. The system as recited in claim 1 wherein said communications network comprises a private switched network.

4. The system as recited in claim 1 wherein said incoming audio/video call is received from a video kiosk.

5. The system as recited in claim 1 wherein said one of said plurality of agent stations comprises a multimedia personal computer.

6. The system as recited in claim 1 wherein said audio ACD is integrated into a private branch exchange (PBX).

7. The system as recited in claim 1 wherein said audio ACD transmits a signal representing said routing control to said video routing circuit via a signaling path.

8. The system as recited in claim 1 wherein said incoming audio/video call comprises computer data, said computer data routed to said one of said plurality of agent stations through said video routing circuit.

9. The system as recited in claim 1 wherein said audio/video call control circuit processes an initial set of video messages and said video routing circuit routes said messages to a calling party through said communications network.

10. The system as recited in claim 1 wherein said audio/video call control circuit terminates said incoming audio/video call when said one of said plurality of agent stations releases said video portion of said call.

11. For use in a call center having a plurality of agent stations and an audio automatic call distribution system (ACD) for routing an incoming audio call received from a communications network to one of said plurality of agent stations, a method that allows said audio ACD to route an audio/video call received into said call center, comprising the steps of:

responding to a video portion of an incoming audio/video call from said communications network and routing an audio portion of said incoming audio/video call to said audio ACD with an audio/video call control circuit, said audio ACD processing said audio portion as an incoming audio call and routing said audio portion to one of said plurality of agent stations; and determining an identity of said one of said plurality of agent stations and routing said video portion to said one of said plurality of agent stations in response thereto with a video routing circuit, both said audio portion and said video portion of said incoming audio/video call thereby routed to said one of said plurality of agent stations in response to routing control given by said audio ACD.

12. The method as recited in claim 11 wherein said communications network comprises a public switched network.

13. The method as recited in claim 11 wherein said communications network comprises a private switched network.

14. The method as recited in claim 11 wherein said incoming audio/video call is received from a video kiosk.

15. The method as recited in claim 11 wherein said one of said plurality of agent stations comprises a multimedia personal computer.

16. The method as recited in claim 11 wherein said audio ACD is integrated into a private branch exchange (PBX).

17. The method as recited in claim 11 further comprising the step of transmitting a signal representing said routing control from said audio ACD to said video routing circuit via a signaling path.

18. The method as recited in claim 11 wherein said incoming audio/video call comprises computer data, the step of determining further comprises the step of routing said computer data to said one of said plurality of agent stations through said video routing circuit.

19. The method as recited in claim 11, wherein:
the step of responding comprises the step of processing an initial set of video messages with said audio/video call control circuit; and
the step of determining comprises the step of routing said initial set of video messages to a calling party through said communications network with said video routing circuit.

20. The method as recited in claim 11 further comprising the step of terminating said incoming audio/video call with said audio/video call control circuit when said one of said plurality of agent stations releases said video portion of said call.

21. For use in a call center having a plurality of agent stations and an audio automatic call distribution system (ACD) for routing an incoming audio call received from a communications network to one of said plurality of agent stations, a system that allows said audio ACD to route an audio/video call received into said call center, comprising:
an audio/video call control circuit, having an associated call queue, for storing a video portion of an incoming audio/video call from said communications network and routing an audio portion of said incoming audio/ video call to said audio ACD, said audio ACD processing said audio portion as an incoming audio call and generating a control signal to route said audio portion to one of said plurality of agent stations; and
an audio/video routing circuit for determining an identity of said one of said plurality of agent stations and routing said both said audio portion and said video portion to said one of said plurality of agent stations in response thereto, both said audio portion and said video portion of said incoming audio/video call thereby routed to said one of said plurality of agent stations in response to said control signal generated by said audio ACD.

22. The system as recited in claim 21 wherein said communications network comprises a public switched network.

23. The system as recited in claim 21 wherein said communications network comprises a private switched network.

24. The system as recited in claim 21 wherein said incoming audio/video call is received from a video kiosk.

25. The system as recited in claim 21 wherein said one of said plurality of agent stations comprises a multimedia personal computer.

26. The system as recited in claim 21 wherein said audio ACD is integrated into a private branch exchange (PBX).

27. The system as recited in claim 21 wherein said audio ACD transmits said control signal to said audio/video routing circuit via a signaling path.

28. The system as recited in claim 21 wherein said incoming audio/video call comprises computer data, said computer data stored in said call queue and routed to said one of said plurality of agent stations through said audio/ video routing circuit.

29. The system as recited in claim 21 wherein said audio/video call control circuit processes an initial set of video messages and said audio/video routing circuit routes said messages to a calling party through said communications network.

30. The system as recited in claim 21 wherein said audio/video call control circuit terminates said incoming audio/video call when said one of said plurality of agent stations releases said video portion of said call.

31. For use in a call center having a plurality of agent stations and an audio automatic call distribution system (ACD) for routing an incoming audio call received from a communications network to one of said plurality of agent stations, a method that allows said audio ACD to route an audio/video call received into said call center, comprising the steps of:
storing a video portion of an incoming audio/video call from said communications network and routing an audio portion of said incoming audio/video call to said audio ACD with an audio/video call control circuit, having an associated call queue, said audio ACD processing said audio portion as an incoming audio call and generating a control signal to route said audio portion to one of said plurality of agent stations; and
determining an identity of said one of said plurality of agent stations and routing said both said audio portion and said video portion to said one of said plurality of agent stations in response thereto with an audio/video routing circuit, both said audio portion and said video portion of said incoming audio/video call thereby routed to said one of said plurality of agent stations in response to said control signal generated by said audio ACD.

32. The method as recited in claim 31 wherein said communications network comprises a public switched network.

33. The method as recited in claim 31 wherein said communications network comprises a private switched network.

34. The method as recited in claim 31 wherein said incoming audio/video call is received from a video kiosk.

35. The method as recited in claim 31 wherein said one of said plurality of agent stations comprises a multimedia personal computer.

36. The method as recited in claim 31 wherein said audio ACD is integrated into a private branch exchange (PBX).

37. The method as recited in claim 31 further comprising the step of transmitting said control signal from said audio ACD to said audio/video routing circuit via a signaling path.

38. The method as recited in claim 31 wherein said incoming audio/video call comprises computer data, the method further comprising the steps of:
   storing said computer data in said call queue of said audio/video call control circuit; and
   determining an identity of said one of said plurality of agent stations and routing said computer data to said one of said plurality of agent stations in response thereto with said audio/video routing circuit.

39. The method as recited in claim 31, wherein:
   the step of storing comprises the step of processing an initial set of video messages with said audio/video call control circuit; and
   the step of determining comprises the step of routing said initial set of video messages to a calling party through said communications network with said audio/video routing circuit.

40. The method as recited in claim 31 further comprising the step of terminating said incoming audio/video call with said audio/video call control circuit when said one of said plurality of agent stations releases said video portion of said call.

41. A call center, comprising:
   a plurality of agent stations;
   an audio automatic call distribution system (ACD) for routing an incoming audio call received from a communications network to one of said plurality of agent stations; and
   a system for allowing said audio ACD to route an audio/video call received into said call center, including:
      an audio/video call control circuit for responding to a video portion of an incoming audio/video call from said communications network and routing an audio portion of said incoming audio/video call to said audio ACD, said audio ACD processing said audio portion as an incoming audio call and routing said audio portion to one of said plurality of agent stations, and
      a video routing circuit for determining an identity of said one of said plurality of agent stations and routing said video portion to said one of said plurality of agent stations in response thereto, both said audio portion and said video portion of said incoming audio/video call thereby routed to said one of said plurality of agent stations in response to routing control given by said audio ACD.

42. The call center as recited in claim 41 wherein said communications network comprises a public switched network.

43. The call center as recited in claim 41 wherein said communications network comprises a private switched network.

44. The call center as recited in claim 41 wherein said incoming audio/video call is received from a video kiosk.

45. The call center as recited in claim 41 wherein said one of said plurality of agent stations comprises a multimedia personal computer.

46. The call center as recited in claim 41 wherein said audio ACD is integrated into a private branch exchange (KPBX).

47. The call center as recited in claim 41 wherein said audio ACD transmits a signal representing said routing control to said video routing circuit via a signaling path.

48. The call center as recited in claim 41 wherein said incoming audio/video call comprises computer data, said computer data routed to said one of said plurality of agent stations through said video routing circuit.

49. The call center as recited in claim 41 wherein said audio/video call control circuit processes an initial set of video messages and said video routing circuit routes said messages to a calling party through said communications network.

50. The call center as recited in claim 41 wherein said audio/video call control circuit terminates said incoming audio/video call when said one of said plurality of agent stations releases said video portion of said call.

51. A method of operating a call center, comprising the steps of:
   providing a plurality of agent stations;
   routing an incoming audio call received from a communications network to one of said plurality of agent stations with an audio automatic call distribution system (ACD); and
   allowing said audio ACD to route an audio/video call received into said call center, the step of allowing comprising the steps of:
      responding to a video portion of an incoming audio/video call from said communications network and routing an audio portion of said incoming audio/video call to said audio ACD with an audio/video call control circuit, said audio ACD processing said audio portion as an incoming audio call and routing said audio portion to one of said plurality of agent stations, and
      determining an identity of said one of said plurality of agent stations and routing said video portion to said one of said plurality of agent stations in response thereto with a video routing circuit, both said audio portion and said video portion of said incoming audio/video call thereby routed to said one of said plurality of agent stations in response to routing control given by said audio ACD.

52. The method as recited in claim 51 wherein said communications network comprises a public switched network.

53. The method as recited in claim 51 wherein said communications network comprises a private switched network.

54. The method as recited in claim 51 wherein said incoming audio/video call is received from a video kiosk.

55. The method as recited in claim 51 wherein said one of said plurality of agent stations comprises a multimedia personal computer.

56. The method as recited in claim 51 wherein said audio ACD is integrated into a private branch exchange (PBX).

57. The method as recited in claim 51 wherein the step of allowing further comprises the step of transmitting a signal representing said routing control from said audio ACD to said video routing circuit via a signaling path.

58. The method as recited in claim 51 wherein said incoming audio/video call comprises computer data, the step of determining further comprises the step of routing said computer data to said one of said plurality of agent stations through said video routing circuit.

59. The method as recited in claim 51, wherein:

the step of responding comprises the step of processing an initial set of video messages with said audio/video call control circuit; and the step of determining comprises the step of routing said initial set of video messages to a calling party through said communications network with said video routing circuit.

60. The method as recited in claim 51 wherein the step of allowing further comprises the step of terminating said incoming audio/video call with said audio/video call control circuit when said one of said plurality of agent stations releases said video portion of said call.

61. For use in a call center having a plurality of agent stations and an audio automatic call distribution system (ACD) for routing an incoming audio call received from a wide area network (WAN) to one of said plurality of agent stations, a system that allows said audio ACD to route an audio/video call received into said call center, comprising:

a WAN hub for receiving an incoming audio/video call from said WAN;

a holding server, having a call queue, for storing a video portion of said incoming audio/video call and routing an audio portion of said incoming audio/video call to said audio ACD, said audio ACD processing said audio portion as an incoming audio call and routing said audio portion to one of said plurality of agent stations; and a multimedia hub for determining an identity of said one of said plurality of agent stations and routing said video portion to said one of said plurality of agent stations in response thereto, both said audio portion and said video portion of said incoming audio/video call thereby routed to said one of said plurality of agent stations in response to routing control given by said audio ACD.

62. The system as recited in claim 61 wherein said WAN comprises a public switched network.

63. The system as recited in claim 61 wherein said WAN comprises a private switched network.

64. The system as recited in claim 61 wherein said incoming audio/video call is received from a video kiosk.

65. The system as recited in claim 61 wherein said one of said plurality of agent stations comprises a multimedia personal computer.

66. The system as recited in claim 61 wherein said audio ACD is integrated into a private branch exchange (PBX).

67. The system as recited in claim 61 wherein said audio ACD transmits a signal representing said routing control to said multimedia hub via a signaling path.

68. The system as recited in claim 61 wherein said incoming audio/video call comprises computer data, said computer data routed to said one of said plurality of agent stations through said multimedia hub.

69. The system as recited in claim 61 further comprising an overflow holding server for processing incoming audio/video calls received into said call center overflowing said holding server.

70. The system as recited in claim 61 wherein said holding server processes an initial set of video messages and said multimedia hub routes said messages to a calling party through said communications network.

71. The system as recited in claim 61 wherein said holding server terminates said incoming audio/video call when said one of said plurality of agent stations releases said video portion of said call.

72. For use in a call center having a plurality of agent stations and an audio automatic call distribution system (ACD) for routing an incoming audio call received from a wide area network (WAN) to one of said plurality of agent stations, a method that allows said audio ACD to route an audio/video call received into said call center, comprising the steps of:

receiving an incoming audio/video call from said WAN in a WAN hub;

storing a video portion of said incoming audio/video call and routing an audio portion of said incoming audio/video call to said audio ACD with a holding server, having a call queue, said audio ACD processing said audio portion as an incoming audio call and routing said audio portion to one of said plurality of agent stations; and determining an identity of said one of said plurality of agent stations and routing said video portion to said one of said plurality of agent stations in response thereto with a multimedia hub, both said audio portion and said video portion of said incoming audio/video call thereby routed to said one of said plurality of agent stations in response to routing control given by said audio ACD.

73. The method as recited in claim 72 wherein said WAN comprises a public switched network.

74. The method as recited in claim 72 wherein said WAN comprises a private switched network.

75. The method as recited in claim 72 wherein said incoming audio/video call is received from a video kiosk.

76. The method as recited in claim 72 wherein said one of said plurality of agent stations comprises a multimedia personal computer.

77. The method as recited in claim 72 wherein said audio ACD is integrated into a private branch exchange (PBX).

78. The method as recited in claim 72 further comprising the step of transmitting a signal representing said routing control from said audio ACD to said multimedia hub via a signalling path.

79. The method as recited in claim 72 wherein said incoming audio/video call comprises computer data, the method further comprising the steps of:

storing said computer data in said call queue of said holding server; and determining an identity of said one of said plurality of agent stations and routing said computer data to said one of said plurality of agent stations in response thereto with said multimedia hub.

80. The method as recited in claim 72 further comprising the step of processing incoming audio/video calls received into said call center overflowing said holding server with an overflow holding server.

81. The method as recited in claim 72, wherein:

the step of storing comprises the step of processing an initial set of video messages with said holding server; and the step of determining comprises the step of routing said initial set of video messages to a calling party through said communications network with said multimedia hub.

82. The method as recited in claim 72 further comprising the step of terminating said incoming audio/video call with said holding server when said one of said plurality of agent stations releases said video portion of said call.

* * * * *